United States Patent
Jakobi et al.

(10) Patent No.: US 10,461,928 B2
(45) Date of Patent: Oct. 29, 2019

(54) EMAIL VERIFICATION

(71) Applicant: Virtual Solution AG, München (DE)

(72) Inventors: Thomas Jakobi, Ingolstadt (DE); Christian Graf Von Spreti, Dürrlauingen (DE)

(73) Assignee: Virtual Solution AG, München (DE)

( * ) Notice: Subject to any disclaimer, the term of this patent is extended or adjusted under 35 U.S.C. 154(b) by 0 days.

(21) Appl. No.: 15/668,486

(22) Filed: Aug. 3, 2017

(65) Prior Publication Data
US 2018/0041335 A1 Feb. 8, 2018

(30) Foreign Application Priority Data

Aug. 8, 2016 (EP) ...................................... 16001759

(51) Int. Cl.
| | | |
|---|---|---|
| G06F 21/30 | (2013.01) | |
| H04L 29/06 | (2006.01) | |
| H04L 9/08 | (2006.01) | |
| G06Q 10/10 | (2012.01) | |
| H04L 9/32 | (2006.01) | |
| H04L 12/58 | (2006.01) | |

(52) U.S. Cl.
CPC ......... H04L 9/0844 (2013.01); G06Q 10/107 (2013.01); H04L 9/3234 (2013.01); H04L 9/3263 (2013.01); H04L 51/28 (2013.01); H04L 63/126 (2013.01); H04L 63/1483 (2013.01); *H04L 9/321* (2013.01); *H04L 51/12* (2013.01); *H04L 51/18* (2013.01)

(58) Field of Classification Search
CPC .......... H04L 63/08; H04L 63/12; G06F 21/30
See application file for complete search history.

(56) References Cited

U.S. PATENT DOCUMENTS 8,904,181 B1 * 12/2014 Felsher ................. H04L 9/0825
                                                                380/282
2007/0143407 A1 * 6/2007 Avritch ................ G06Q 10/107
                                                                709/206
2009/0138711 A1   5/2009 Heimbigner
(Continued)

FOREIGN PATENT DOCUMENTS

GB           2509045 A  *  6/2014    ......... H04L 63/0823

OTHER PUBLICATIONS

European Patent Office, Extended European Search Report, issued in connection with European Patent Application No. 16001759.6, dated Feb. 3, 2017, 5 pages.
(Continued)

*Primary Examiner* — Izunna Okeke
(74) *Attorney, Agent, or Firm* — Hanley, Flight & Zimmerman, LLC.

(57) ABSTRACT

An identity of an email-address utilized by a client device is verified. According to one example, a server receives a request for verifying the identity of the email-address and calculates a first verification token, which is transmitted to the email address to be verified. The first verification token is received by the client device, which in response calculates a second verification token. The second verification token is transmitted to the server. The server verifies the identity of the email-address by verifying that the first and second verification tokens are identical. Other examples are disclosed.

19 Claims, 6 Drawing Sheets

(56) References Cited

U.S. PATENT DOCUMENTS

2012/0204032 A1* 8/2012 Wilkins ............... H04L 9/006
 713/170
2012/0216040 A1 8/2012 Tanamy et al.
2013/0333030 A1 12/2013 Farris

OTHER PUBLICATIONS

European Patent Office, Intention to Grant, issued in connection with European Patent Application No. 16001759.6, dated Mar. 22, 2018, 7 pages.

* cited by examiner

EMAIL VERIFICATION

TECHNICAL FIELD

The present disclosure relates to information technology security and secure communication. More specifically, it relates to email verification and, in one example, to verifying an identity of an email-address utilized by a client device.

BACKGROUND

In the digital age the verification and security of digital identities is of great importance. When registering for a digital service, the service frequently uses an email-address of the registering person as primary source of information to establish contact with said person. Further, the email address may provide certain information about the person's identity.

In order to make sure that a registering person is in actual possession of an email-address provided with the registration, email verification methods are regularly used. Known email verification methods send a verification email message comprising a confirmation link including a first confirmation code to the registering person. Upon clicking on the provided confirmation link, the first confirmation code is transmitted to a registration server. If the transmitted first confirmation code is identical to a second confirmation code stored in a backend of the registration server, the identity of the email is verified.

BRIEF DESCRIPTION OF THE FIGURES

The methodologies presented herein are described with reference to the accompanying figures. Similar reference numbers generally indicate identical or functionally similar elements.

DETAILED DESCRIPTION

Figure 1:
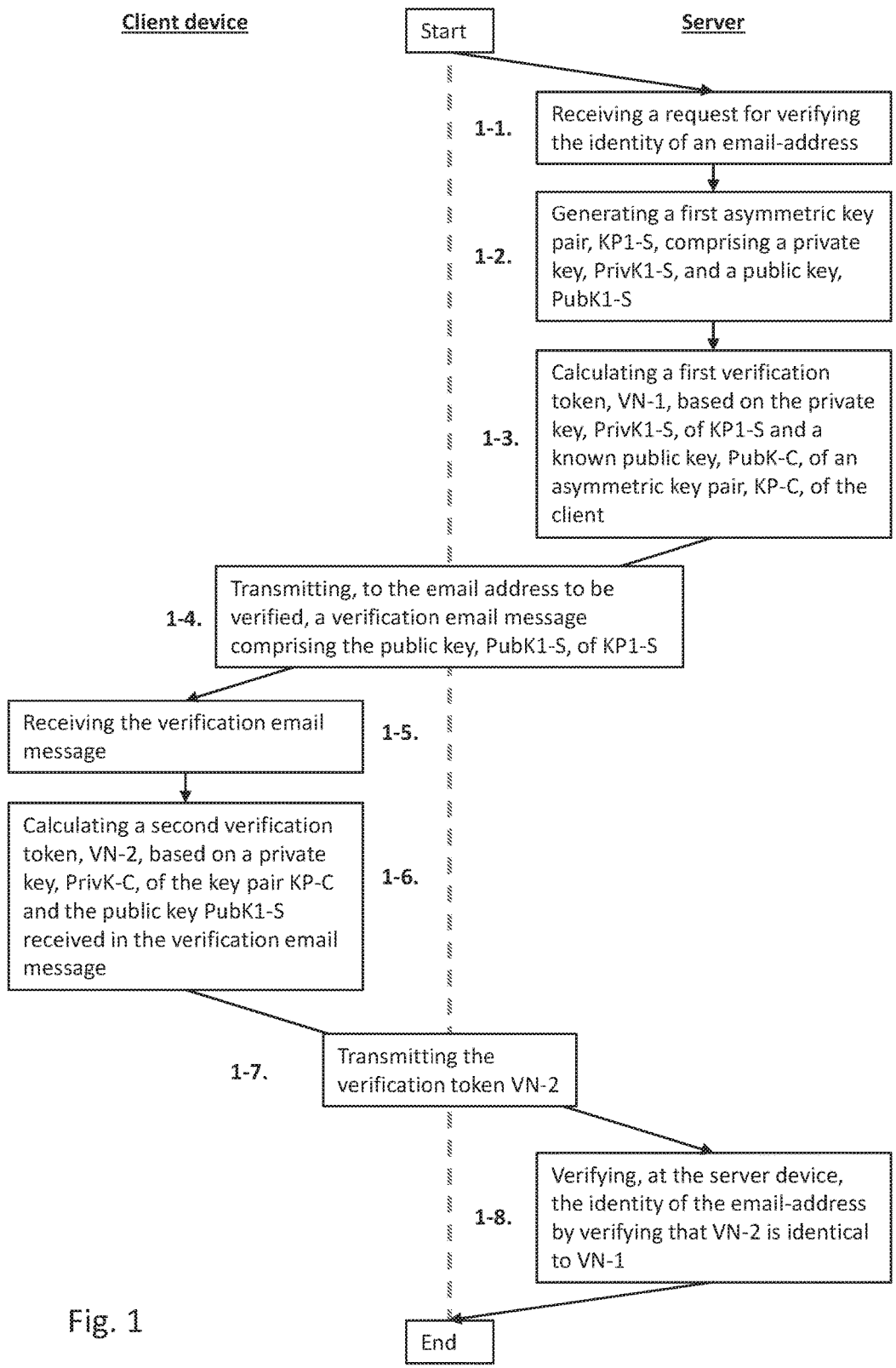
FIG. 1 is a flowchart representative of example machine readable instructions that may be executed to implement a first example of a method for email verification.

FIG. 1 is a flowchart outlining a first example of a method for verifying an identity of an email-address utilized by a client device. The method involves both a server as well as a client device. Nevertheless, some examples also consider both the sub-method of the server and the client device as independent methods.

In some examples, the server is a virtual server. Other examples use dedicated servers or shared servers. The server may employ any operating system such as UNIX® or Windows®.

The client device may be a mobile or a stationary client device. For example, the client device may be a personal computer (PC), a laptop, a tablet computer, a mobile phone such as a smartphone, a pager, a smart watch, etc. Operating systems controlling the client system include, for example, any one of Windows®, iOS®, MacOS®, Android®, Linux®, etc. The client device may use any type of personal information manager (PIM) application, such as SecurePIM®, Outlook®, Thunderbird®, Lotus Notes®, etc.

Common communication protocols for handling the communication between the server and the client device comprise SMTP, POP3, IMAP, SMAP etc.

In some examples, server and client device are directly connected with each other, for example within a local area network (LAN). Ethernet technology may be used. In other examples, the server is located remotely from the client device and accessible via internet. Internet protocols such as TPC/IP may be used for communication with the server.

In the context of the described methodology, the term "email" is to be understood broadly. It generally comprises all kinds of electronic/digital communication requiring a user account. Besides the "traditional email message," the described methodology may also be employed within the concept of more recent mailing applications such as Skype®, WhatsApp®, iMessage®, Telegram®, etc.

According to the first example, in 1-1 the server receives a request for verifying the identity of an email-address utilized by the client device. In some examples, the client device itself directly transmits said request to the server. However, in other examples a third party device or system transmits the request to the server. The request comprises the email-address to be verified. In some examples, the request comprises further information, for example a public key PuK-C of an asymmetric key pair PK-C related to the email-address to be verified.

In response to receiving the request for verification, in 1-2 the server generates a first asymmetric key pair, PK1-S, comprising a private key, PrK1-S, and a public key, PuK1-S. The generation of PK1-S may be based on any known asymmetric cryptography method.

Asymmetric cryptography methods are generally known and involve an asymmetric key pair comprising a public key and a private key. While the public key may be known to the public and is not to be kept secret, only the rightful user of the asymmetric key pair is to know the private key. For the security of asymmetric cryptography methods it is important that the private key is not known to the public. As explained in detail later, asymmetric cryptography methods may be used for signing and/or encrypting of digital communication.

Based on the generated private key PrK1-S and a known public key PuK-C of an asymmetric key pair PK-C of the client, in 1-3 the server calculates a first verification token, VN-1. The calculation of VN-1 is based on the same asymmetric cryptography method used for the generation of both key pairs PK1-S and PK-C. In response to the calculation of the verification token VN-1, the latter is stored in a backend of the server.

In 1-4, the public key PuK1-S generated in 1-2 is included to a verification email message. Subsequently, the server transmits the verification email message comprising PuK1-S to the email-address to be verified. For the transmittal of the verification email message regular email service may be used. In some examples, the used email service has to fulfil certain security requirements.

In 1-5, the client device having access to the inbox of the email-address to be verified receives the verification email message. In reaction to the extraction of the public key PuK1-S comprised in the verification email, in 1-6 the client device calculates a second verification token VN-2. The calculation of the second verification token VN-2 is based on the public key PuK1-S received in the verification email message and the private key PrK-C of the asymmetric key pair PK-C of the client. As pointed out above, the known public key PuK-C of PK-C was used in 1-3 for the calculation of the first verification token VN-1. For the calculation of VN-2 the identical asymmetric cryptography method used for the calculation of VN-1 is used.

In response to the calculation of the second verification token VN-2, in 1-7 the client device transmits VN-2 to the server. For the transmittal, a regular email service as well as any other communication service ensuring that VN-2 receives the server may be used. In some examples, the used communication service has to fulfill certain security requirements.

In response to receiving the verification token VN-2 from the client device, in 1-8 the server verifies the identity of the email address to be verified. For this purpose, the server compares the received verification token VN-2 with the verification token VN-1, which was calculated in 1-3 and is stored in the backend of the server. In response to finding that both verification tokens VN-1 and VN-2 are identical, the identity of the email address is verified and the verification method is successfully completed.

In some examples, in response to finding that both verification tokens VN-1 and VN-2 are not identical, the verification method is aborted. In this case, the identity of the email address is not verified. In some examples, the server issues a notification message informing about the failed email verification attempt and sends it to the corresponding email address.

The above described example, as well as the methodologies described herein in general, ensure an increased level of security compared to the known email verification methods of the prior art.

In particular, email verification as described herein is not prone to so-called "man in the middle attacks." A man in the middle attack is an attack in which the attacker secretly intercepts the communication between two parties. If known email verification methods (see above) are used, a "man in the middle" may be able to verify the identity of an email address even if he is not in actual possession of said email address, i.e. if s/he is actually not able to access the email account connected with said email address. This is the case, as for successful verification via known verification methods knowledge of the sent confirmation code is sufficient. If the man in the middle intercepts the verification email comprising the confirmation code, he could return the confirmation code to the verification server and thereby have the identity of the email address verified without actual possession of the email address.

Such a scenario is not possible based on email verification, as described herein. As the verification email message sent to the email address to be verified does not comprise the verification token VN-2 but only the public key PuK1-S, which generally may be known to public anyways, a man in the middle cannot have the identity of an email-address verified even if he intercepts the sent verification email message. In order to have an email address verified based on the examples disclosed herein, at least knowledge of the public key PuK1-S, the private key PrK-C, and the asymmetric cryptography method used is required. Only in knowledge of these three items the correct VN-2 may be calculated. However, only the client side knows the PrK-C. In particular, the PrK-C is never communicated between the client device and the server. Thus, a man in the middle unrightfully cannot verify the identity of an email address of which he is not in possession. Therefore, the email verification methods described herein provide an increased level of security compared to the known email verification methods of the prior art.

Figure 2A:
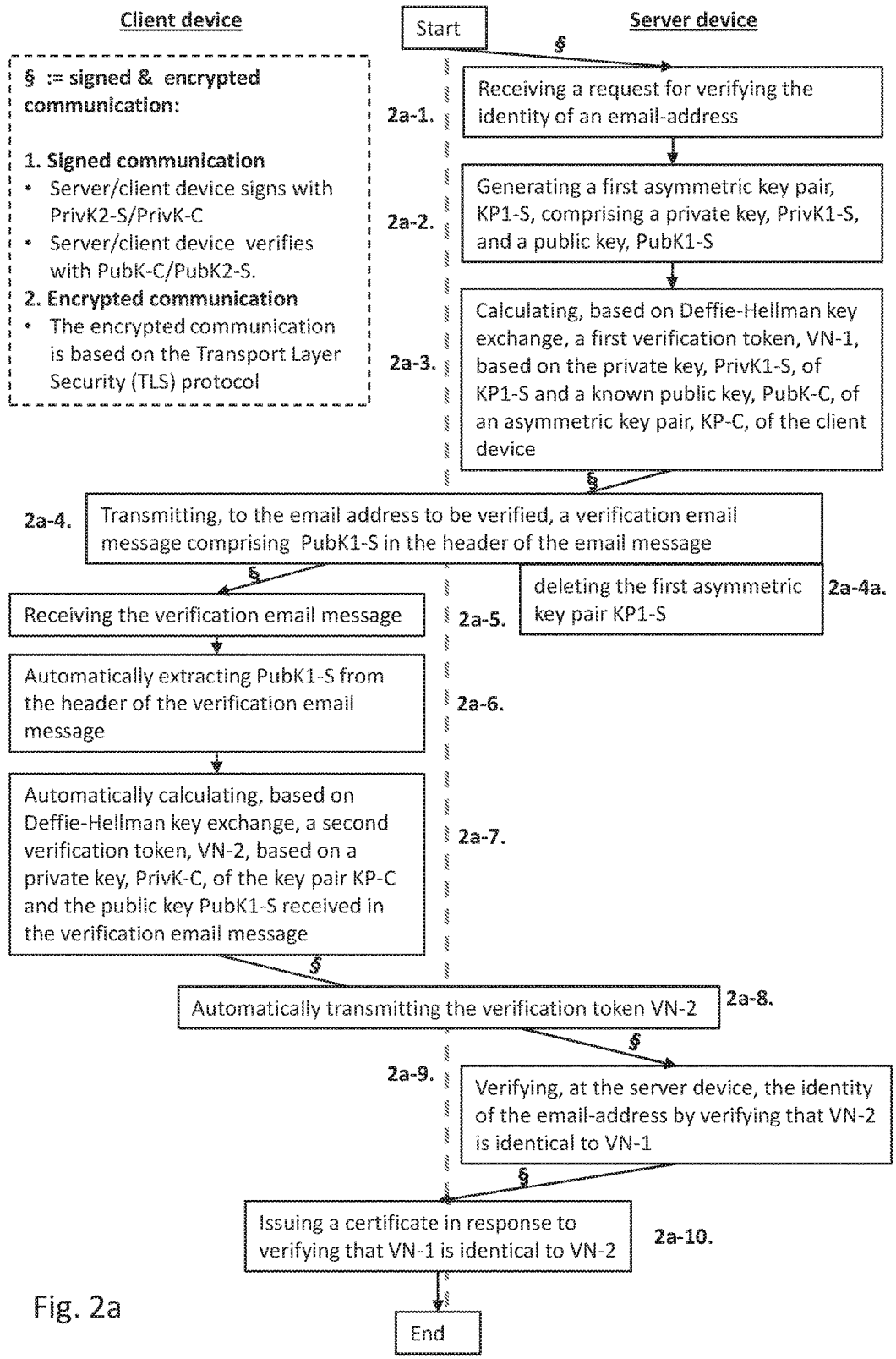
FIG. 2a is a flowchart representative of example machine readable instructions that may be executed to implement a second example of a method for email verification.

FIG. 2a is a flowchart outlining a second example of a method for verifying an identity of an email-address. The method of the second example builds on the method of the first example described with reference to FIG. 1. Therefore, if not stated otherwise, the description regarding the first example applies for the second example as well. To avoid repetition, similar method actions are not described again with respect to the second example. Rather, reference is made to the description of the first example.

As indicated by the "§"-symbol in FIG. 2a, the communication between the client device and the server in the second example is performed as both a signed and an encrypted communication. In some examples, not all but only particular communication between the server and client device is signed and encrypted.

Signing a communication allows the recipient of a communication to verify the identity of the sender of the communication. Encrypting a communication, on the other hand, enables only the designated recipient to decrypt the communication and access its content. Thus, the parallel use of both signature and encryption methods for the communication between the client device and the server ensures a high level of data security.

In some examples, digitally/electronically signed communication processes and encrypted communication processes are implemented individually and separate from each other. This also ensures an increased level of security compared to methods, which do not rely on signed and/or encrypted communication at all.

According to the second example of FIG. 2a, the server signs its communication to the client device with a private key PrK2-S of a second asymmetric key pair, PK2-S, of the server. In some examples, PK2-S is generated by the identical asymmetric cryptography method used for the generation of the first asymmetric key pair PK1-S of the server. However, in other examples known asymmetric cryptography method different from the method used for the generation of PK1-S are used.

If the client device receives a signed communication from the server, it verifies the received communication with a known public key PuK2-S. In some examples, PuK2-S is stored on an arbitrary public database for public keys. In other examples, the server directly communicates PuK2-S to the client device. In some examples, the communication of PuK2-S to the client device takes place prior to receiving a request for verifying the identity of an email address (2a-1). The example disclosed herein generally also envisage any other way of providing information about public keys.

The client device signs its communication to the server with a private key PrK-C of an asymmetric key pair, PK-C, of the client device. As mentioned above, PK-C is generated by the identical asymmetric cryptography method used for the generation of the first asymmetric key pair PK1-S of the server.

If the server device receives a signed communication from the client device, it verifies the received communication with the known public key PuK-C. For obtaining knowledge of PuK-C, the above comments set forth with respect to PuK2-S apply mutatis mutandis.

The server encrypts its communication to the client device with the known public key PuK-C of the client device. If the client device receives an encrypted communication from the server, it decrypts the received encrypted communication with its private key PrK-C of PK-C.

Similarly, the client device encrypts its communication to the server with the known public key PuK2-S of the server. If the server receives an encrypted communication from the client device, it decrypts the received encrypted communication with its private key PrK2-S of PK2-S.

In 2a-3 of FIG. 2a, the server calculates the first verification token VN-1 based on the private key PrK1-S and the public key PuK-C. For the calculation of VN-1 a "Deffie-Hellman key exchange method" is used. Similarly, in 2a-7 the client device calculates the second verification token VN-2 based on PrK-C and PuK1-S. The calculation of VN-2 is based on the identical Diffie-Hellman key exchange method used for the calculation of VN-1.

Deffie-Hellman key exchange is a known method, which is used in the prior art for securely and publicly exchanging cryptographic keys. The secure exchange of cryptographic keys is one of the main security requirements for symmetric encryption methods, where both parties of a communication use an identical cryptographic key.

A core of Deffie-Hellman key exchange is the use of mathematical functions, which easily can be calculated but only hardly be inversed. Deffie-Hellman key exchange frequently uses discrete exponential functions. They can be quickly calculated even for large exponents. However, for the calculation of their inverse function, the discrete logarithm, no quick and efficient algorithm is known yet. Thus, discrete exponential functions are well suited for Deffie-Hellman key exchange, as they represent so-called "one way functions."

Some examples use an "elliptic curve Diffie-Hellman key exchange method" for the calculation of the verification tokens. Elliptic curve Diffie-Hellman key exchange is a modification of the regular Diffie-Hellman key exchange using elliptic curves instead of finite bodies for the underlying mathematical functions. The use of elliptic curves results in an increased level of security compared to regular Diffie-Hellman methods if identical key lengths are used.

In 2a-4 of the example of FIG. 2a, the server sends a verification email message to the email address to be verified. The verification email message comprises the public key PuK1-S in its header. The allocation of PuK1-S in the header of the verification email message facilitates faster and more efficient searching processes for finding and extracting the public key compared to an allocation of the public key anywhere in or in the body of an email message. If the public key is located anywhere in the verification email message, the receiving client device has to search the entire email message, i.e. both its header and body, for the public key. If the public key is located in the body of the verification email message, the client device has to search the body for the public key. Searching the body of an email message for a particular string such as a public key is generally more complex compared to searching its header, as the body's content generally does not have a syntax as structured as the header. Consequently, including the public key in the header of the verification email message reduces the complexity of email verification.

In some examples, a proprietary header tag is used for embedding the public key PuK1-S into the header of the verification email message. Other examples embed the public key into the body of the verification email message. There, a proprietary body tag such as as MIME data field may be used for embedding the public key.

Figure 2B:
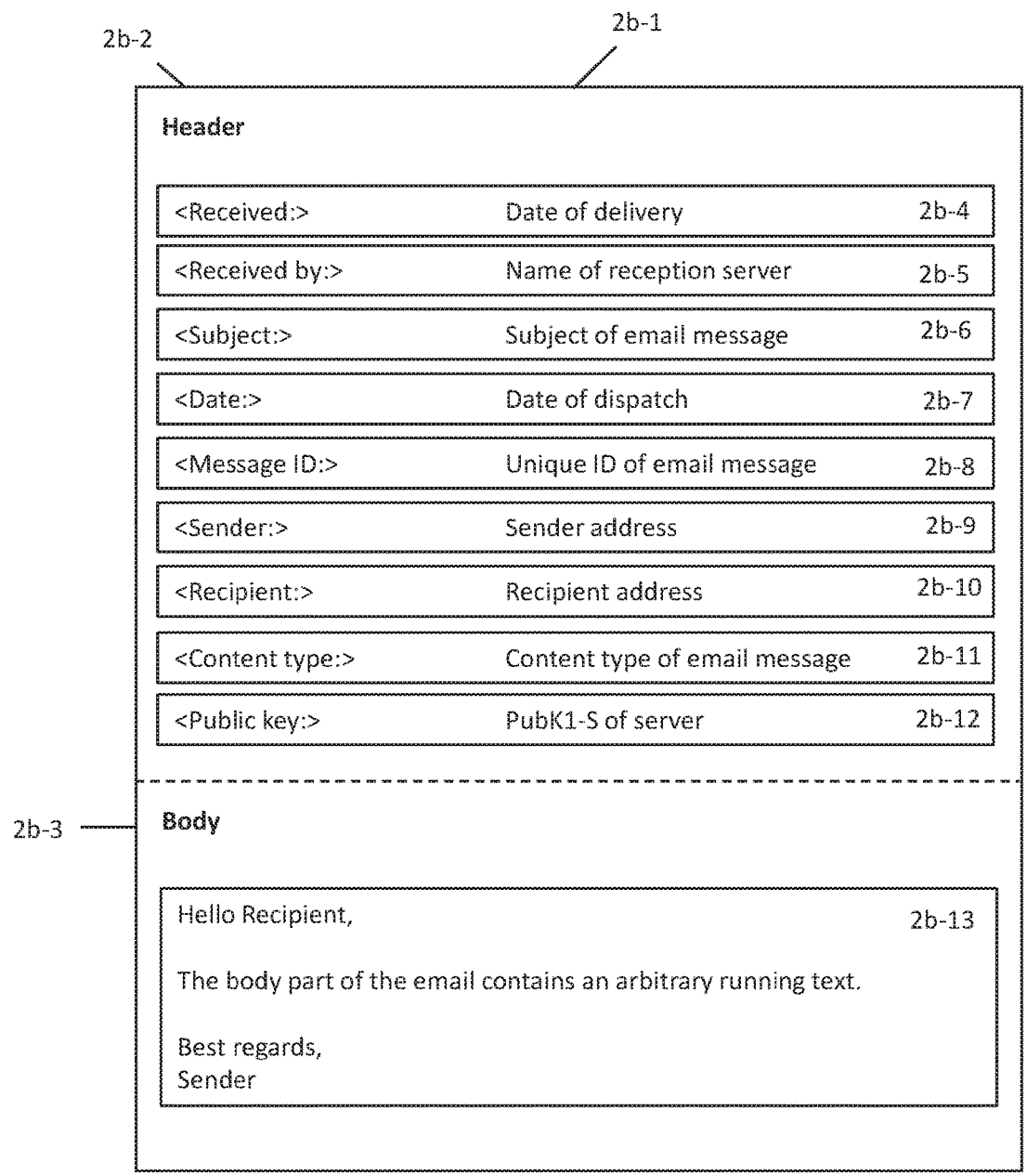
FIG. 2b is a schematic representation of an example email message structure.

FIG. 2b is a schematic representation of a structure of an example email message 2b-1. It is to be understood that FIG. 2b only shows typical components of an email message by way of example. Email messages may comprise different, further or less components than shown in FIG. 2b. For example, as mentioned above, the email message may be electronically signed in which case the email message additional includes an electronic signature.

The email message of FIG. 2b comprises a header section 2b-2 and a body section 2b-3. The header section 2b-2 comprises information about the email message, which is structured using proprietary header tags. The <Received:> tag 2b-4 indicates the date of delivery of the email message to the sender. The <Received by:> tag 2b-5 indicates the name of the reception server of the email message. The <Subject:> tag 2b-6 indicates the subject of the email message. The <Date:> tag 2b-7 indicates the date of dispatch of the email message. The <Message ID:> tag 2b-08 indicates the unique message ID of the email message. The <Sender:> tag 2b-9 indicates the address of the sender of the email message. The <Recipient:> tag 2b-10 indicates the address of the recipient of the email message. The <Content type:> tag 2b-10 indicates the type of content of the email message, for example the character set used for the email message (e.g. "UTF-8"). Finally, the <Public key:> proprietary tag 2b-12 indicates the public key PuK1-S of the server, as described above. The body section 2b-3 comprises an arbitrary running text 2b-13 composed by the sender of the email message.

In 2a-4a, in response to the verification email message being transmitted to the email address to be verified, the first asymmetric key pair PK1-S is deleted by the server. After sending the public key PuK1-S to the email address to be verified, there is no further use of PK1-S for the server. For the further verification process, only the verification token VN-1, which is stored in the server's backend, is required. Therefore, the deletion of PK1-S avoids the unnecessary use of server storage space and thus saves server resources. In other examples, the first asymmetric key pair PK1-S is deleted by the server only in response to receiving the response to the verification email message from the client device. Keeping the first asymmetric key pair PK1-S until this point of time may be useful in the event that the first transmission of the verification email message fails and the verification email message has to be re-transmitted.

In 2a-5 of FIG. 2a, the client device receives the verification email message. In order to receive the verification email message, the client device generally has to access the inbox of the email account, whose email address is to be verified. In some examples, the client device has to obtain authorization to access the inbox of the email address to be verified individually for each email message to be received, e.g. by executing a login process using valid login credentials. In other examples, the client device has a general authorization to access the inbox of the respective email account and therefore does not have to obtain a new authorization each time the email account is to be accessed.

In some examples, the client device automatically obtains authorization to access the email account of the email address to be verified. In other examples, the user of the client device manually has to grant authorization to access said email account.

In response to accessing the email account, in some examples the client device searches the inbox for an email message comprising the public key PuK1-S. In some examples, only the header of the email messages is searched (see 2a-4 of the second example). In response to finding an email message comprising PuK1-S, the client device identifies said email message as verification email message and receives it, for example by downloading it to the client device.

In some examples, the client device systematically searches for a known proprietary tag (header tags and/or body tags), which is used to embed the public key PuK1-S into the email verification message. Systematically searching for known proprietary tags may increase the speed of the search, as only a predetermined string (the proprietary tag) needs to be found instead of an unknown string of a certain predefined structure (the public key itself).

In response to receiving the verification email message, in 2a-6 the client device extracts PuK1-S from the received verification email message. In some examples, the extraction process is triggered and performed automatically, i.e. no interaction of a user of the client device is necessary. In other examples, the user manually has to interact with the client device in order to instruct the extraction process.

In 2a-7 of FIG. 2a, the client device calculates the second verification token VN-2 based on the received public key PuK1-S and the private key PrK-C of the client. As already mentioned above, in the example of FIG. 2 the client device uses a Deffie-Hellman key exchange method for the calculation.

In response to the calculation of VN-2, in 2a-8 the latter is transmitted by the client device to the server. The transmission of the second verification token VN-2 may be performed by a response email message with a similar structure as the verification email message shown by FIG. 2b. Again, the second verification token VN-2 may be included in the header of the response email message e.g. by using a proprietary tag, e.g. <Verification token:>.

In the example of FIG. 2a, the calculation of 2a-7 as well as the transmission of 2a-8 are performed automatically. In this context, automatically means that no interaction of a user with the client device is needed in order to trigger and perform said actions. Thus, the automatization of these activities—performed by the client device—releases a user of the client device.

In the known email verification processes, a user manually has to click on a confirmation link sent with the verification email message to trigger the transmission of a confirmation code. Thus, automatization of the email verification as foreseen by the examples disclosed herein increases the usability and accelerates the speed of email verification compared to the processes known in the prior art.

In response to the server finding that the verification token VN-1 and VN-2a are identically and thus verifying the identity of the email address to be verified (2a-9), in 2a-10 a certificate may be issued for the verified email address. In some examples, the certificate is a class 1 certificate. A class 1 certificate generally certifies the existence of an email address. In other examples, different certificates are issued. The kind of certificate being issued in 2a-10 may generally depend on the level of verification and security that is achieved with the particular example of the email verification method used.

In some examples, in 2a-10 the server issues the certificates itself. In other examples, the server informs a third party certification authorities (CA) of the positive outcome of the verification process. In response to this information, the CA issues a certificate for the verified email address.

Some examples only verify the identity of the email address only for a given amount of time. In some examples, the verification of an email address expires after 30 days, 60 days, or 90 days. Other examples foresee expiration times of 6 month, 12 month, 18 month or even longer. If the example includes issuing a certificate according to 2a-10, the issued certificate may only be valid for the amounts of time given above In response to the issuing of a certificate, the email verification method of FIG. 2a successfully finished.

Figure 3:
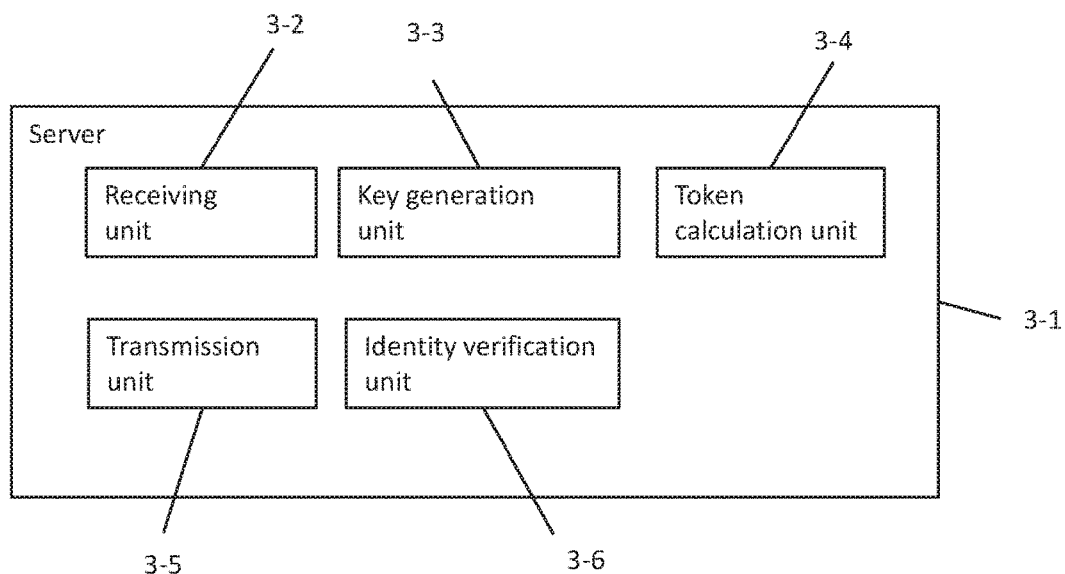
FIG. 3 is a schematic representation of an example server for verifying an identity of an email-address utilized by a client device by carrying out the example methods of email verification disclosed herein.

FIG. 3 is a schematic representation of a server 3-1 for verifying an identity of an email-address utilized by a client device according to an example. The server 3-1 comprises a receiving unit 3-2, a key generation unit 3-3, a token calculation unit 3-4, a transmission unit 3-5 and an identity verification unit 3-6. Although FIG. 3 depicts each unit individually, the scope of the invention is not limited to servers having individual units in the sense of physical units. In some examples, a single server unit executes several tasks within the email verification process. In some examples, a single server unit, for example a processor unit, executes all the task of the email verification process.

In general, the server is defined by its adaption to perform the method of email verification as described above. In some examples, the server is adapted to receive a request for verifying the identity of the email-address;

generate a first asymmetric key pair, PK1-S, comprising a private key, PrK1-S, and a public key, PuK1-S;

calculate a first verification token, VN-1, based on the private key, PrK1-S, of PK1-S and a known public key, PuK-C, of an asymmetric key pair, PK-C, of the client;

transmit a verification email message to the email-address to be verified comprising the public key, PuK1-S, of PK1-S;

receive a response to the verification email message including a second verification token, VN-2, calculated by the client device based on a private key, PrK-C, of PK-C and the public key, PuK1-S, transmitted in the verification email message;

verify the identity of the email-address by verifying that VN-2 is identical to VN-1.

Figure 4:
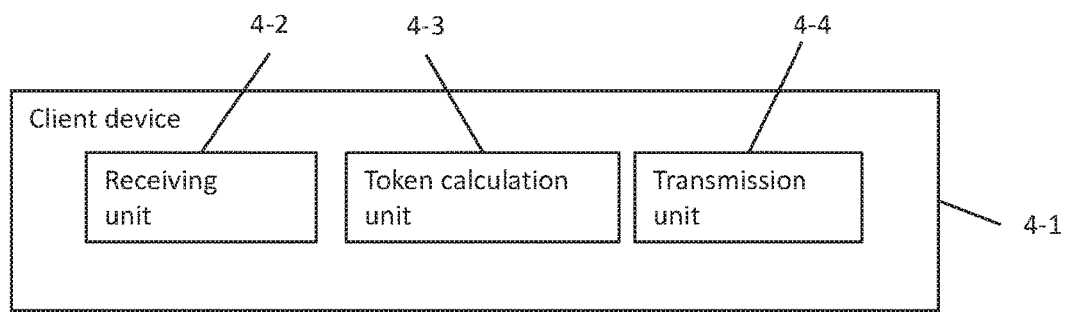
FIG. 4 is a schematic representation of an example client device for verifying an identity of an email-address utilized by a client device by carrying out the example methods of email verification disclosed herein.

FIG. 4 is a schematic representation of a client device 4-1 for verifying an identity of an email-address utilized by a client device according to an example. The client device has a receiving unit 4-2, a token calculation unit 4-3, and a transmission unit 4-4. Although FIG. 4 depicts each unit individually, the methodologies described herein are not limited to client devices having individual units in the sense of physical units. In some examples, a single client device unit executes several tasks within the email verification process of the present invention. In some examples, a single client device unit, for example a processor unit, executes all the task of the email verification process.

In general, the client device is defined by its adaption to perform the method of email verification as described above. In some examples, the client device is adapted to receive a verification email message comprising a public key, PuK1-S, of a first asymmetric key pair, PK1-S, of a server, wherein the verification email message was transmitted to the email-address to be verified;

calculate a verification token, VN-2, based on a private key, PrK-C, of an asymmetric key pair, PK-C, of the client and the public key PuK1-S received in the verification email message;

transmit the verification token VN-2 to the server.

Figure 5:
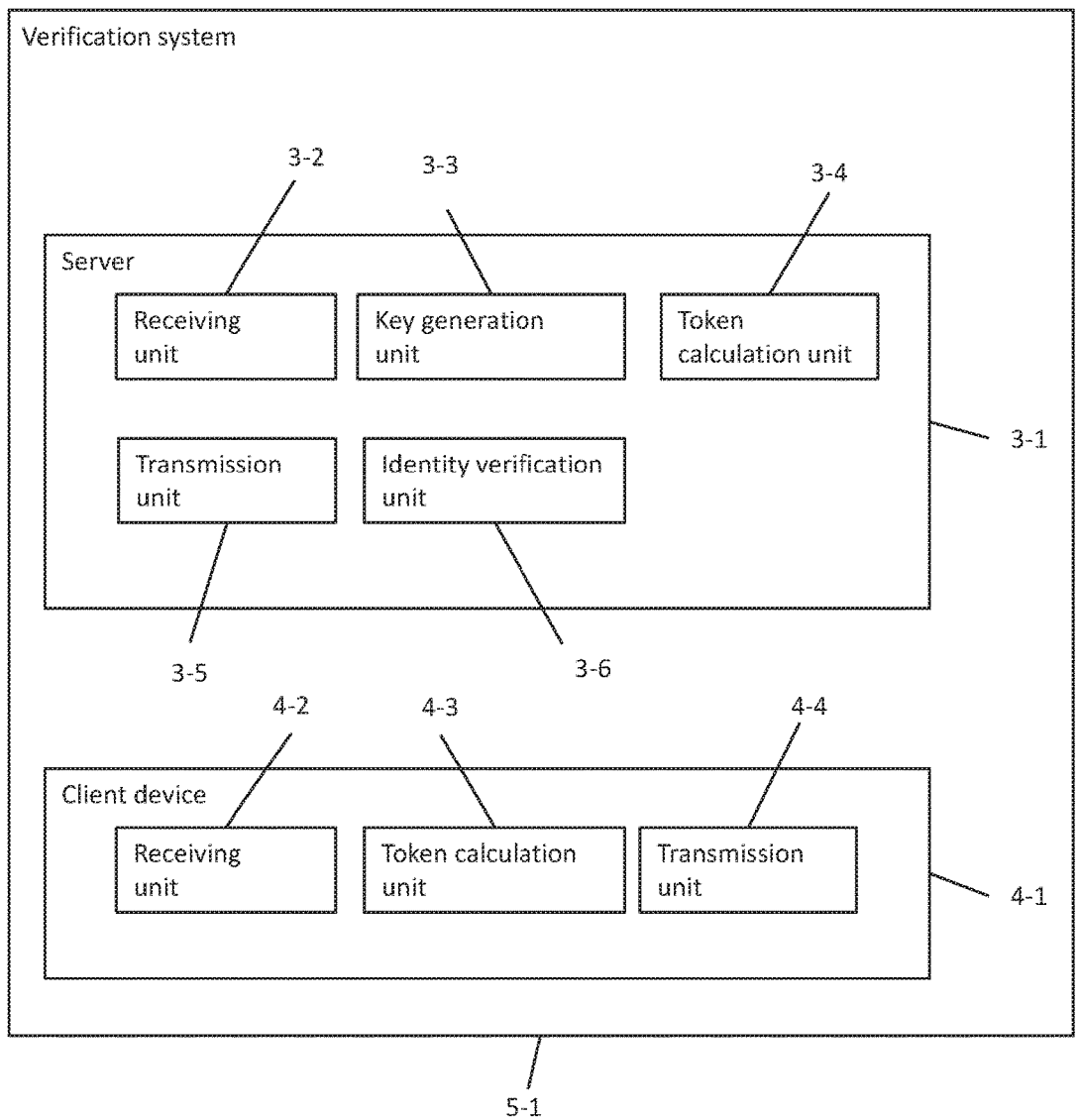
FIG. 5 is a schematic representation of an example system comprising both the server of FIG. 3 and the client device of FIG. 4 for verifying an identity of an email-address utilized by a client device according to an example.

FIG. 5 is a schematic representation of a system with both the server of FIG. 3 and the client device of FIG. 4 for verifying an identity of an email-address utilized by a client device according to an example. The comments made with respect to the examples of FIGS. 3 and 4 similarly apply for the system of FIG. 5.

In general, the system is defined by its adaption to perform the method of email verification as described above. In some examples, the client device is adapted to
- receive, at the server, a request for verifying the identity of the email-address;
- generate, at the server, a first asymmetric key pair, PK1-S, comprising a private key, PrK1-S, and a public key, PuK1-S,
- calculate, at the server, a first verification token, VN-1, based on the private key, PrK1-S, of PK1-S and a known public key, PuK-C, of an asymmetric key pair, PK-C, of the client;
- transmit, from the server to the email-address to be verified, a verification email message comprising the public key, PuK1-S, of PK1-S;
- receive, at the client device, the verification email message;
- calculate, at the client device, a second verification token, VN-2, based on a private key, PrK-C, of the key pair PK-C and the public key PuK1-S received in the verification email message;
- transmit, from the client device to the server, the verification token VN-2;
- verify, at the server, the identity of the email-address by verifying that VN-2 is identical to VN-1.

Figure 6:
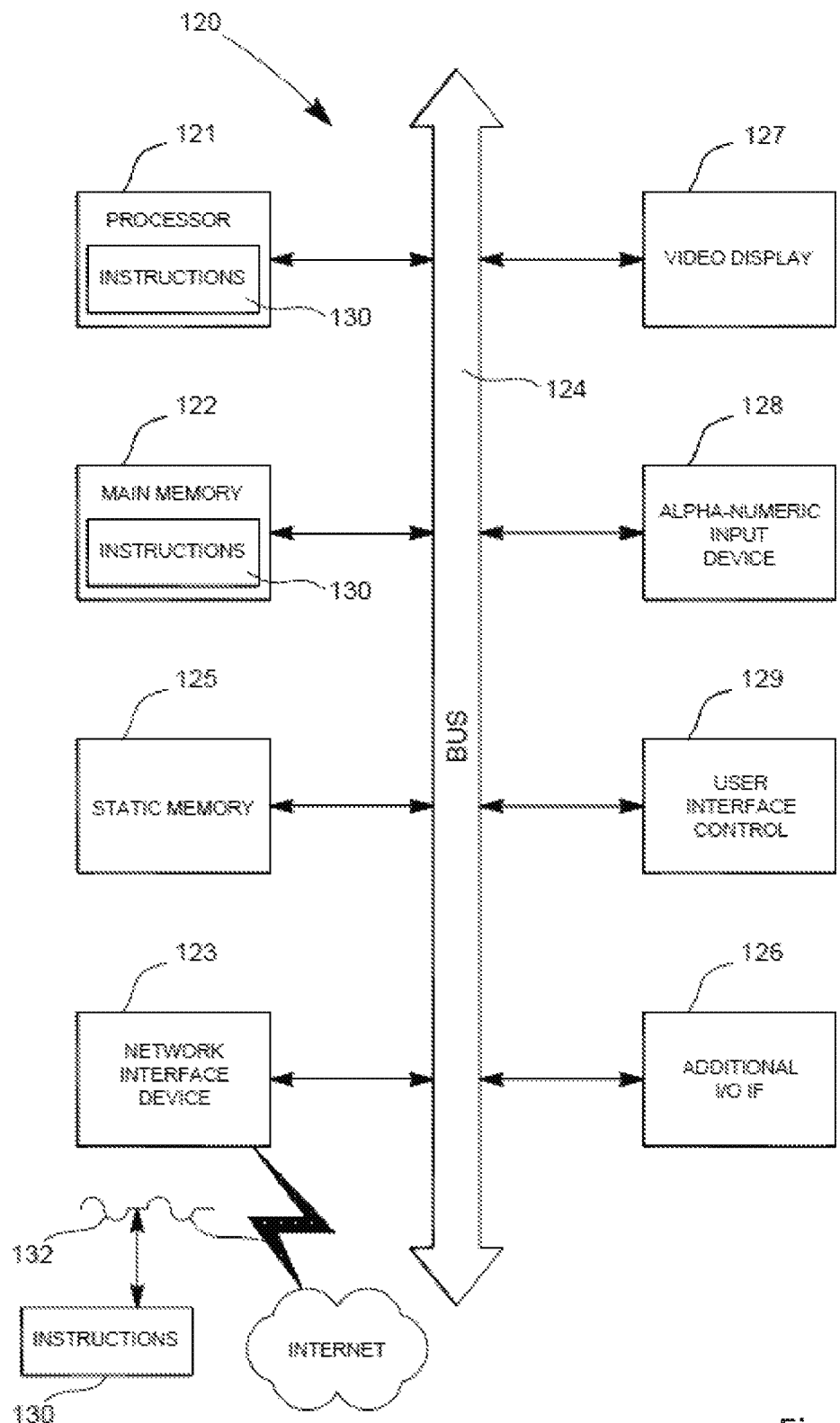
FIG. 6 is an exemplary schematic view of the internal architecture of a computer/server to carry out example method of email verification as described herein.

FIG. 6 is a diagrammatic representation of the internal structure of a computer system 120 which visualizes the internal hardware structure of the server 3-1 and/or of the client device 4-1, which implement the email verification mechanisms described herein. The computer system 120 is arranged to execute a computer program for verifying an identity of an email-address utilized by a client device, the computer program having instructions, which when executed on a computer system and/or server cause the computer system and/or server to execute the methods of the examples of the present invention as described above.

The computer system or server 120 includes a processor 121, a main memory 122 and, optionally, a wireless network interface 123 (such as a Wi-Fi and/or Bluetooth interface) and/or a 2G/3G/4G mobile network interface device, all of which communicate with each other via a bus 124. It further includes a static memory 125, e.g. non-removable flash and/or solid state drive and/or a removable Micro or Mini SD card, which permanently stores the software enabling computer/server 120 to execute its functions, such as a computer program for verifying an identity of an email-address utilized by a client device, and to optionally communicate with client computers/devices within a local or wide area network via its wired and/or wireless network interface device 123. Furthermore, computer/server 120 includes a display 127, a user interface control module 129 and an alpha-numeric and cursor input device 128. Optionally, additional I/O interfaces 126 such as card reader and USB interfaces may be present. An executable set of instructions (i.e. software) 130 embodying any one, or all, of the methodologies described above, resides completely, or at least partially, permanently in the non-volatile memory 125. When being executed, respective process data resides in the main memory 122 and/or the processor 121. The software 130 may further be transmitted or received as a propagated signal 132 through the wired or wireless network interface device 123 from/to a software server within the local area network or the Internet.

Numerous examples are provided herein. According to one example, a method for verifying an identity of an email-address utilized by a client device is provided. The method is performed by a server and includes the following activities:
- receiving a request for verifying the identity of the email-address;
- generating a first asymmetric key pair, PK1-S, comprising a private key, PrK1-S, and a public key, PuK1-S;
- calculating a first verification token, VN-1, based on the private key, PrK1-S, of PK1-S and a known public key, PuK-C, of an asymmetric key pair, PK-C, of the client;
- transmitting a verification email message to the email-address to be verified comprising the public key, PuK1-S, of PK1-S;
- receiving a response to the verification email message including a second verification token, VN-2, calculated by the client device based on the private key, PrK-C, of PK-C and the public key, PuK1-S, transmitted in the verification email message;
- verifying the identity of the email-address by verifying that VN-2 is identical to VN-1.

According to another example, a method for verifying an email-address utilized by a client device is provided. The method is performed by the client device and includes the following activities:
- receiving a verification email message comprising a public key, PuK1-S, of a first asymmetric key pair, PK1-S, of a server, wherein the verification email message is received by the email-address to be verified;
- calculating a verification token, VN-2, based on a private key, PrK-C, of an asymmetric key pair, PK-C, of the client and the public key PuK1-S received in the verification email message;
- transmitting the verification token VN-2 to the server.

According to yet another example, a method for verifying an identity of an email-address utilized by a client device is provided. The method includes the following activities:
- receiving, at a server, a request for verifying the identity of the email-address;
- generating, at the server, a first asymmetric key pair, PK1-S, comprising a private key, PrK1-S, and a public key, PuK1-S,
- calculating, at the server, a first verification token, VN-1, based on the private key, PrK1-S, of PK1-S and a known public key, PuK-C, of an asymmetric key pair, PK-C, of the client;
- transmitting, from the server to the email-address to be verified, a verification email message comprising the public key, PuK1-S, of PK1-S;
- receiving, at the client device, the verification email message;
- calculating, at the client device, a second verification token, VN-2, based on a private key, PrK-C, of the key pair PK-C and the public key PuK1-S received in the verification email message;
- transmitting, from the client device to the server, the verification token VN-2;
- verifying, at the server, the identity of the email-address by verifying that VN-2 is identical to VN-1.

According to yet another example, a server, a client device, and a system each being adapted to perform the above methods are provided.

According to yet another example, a computer program product to perform the above methods at the server and at the client, respectively, is provided.

Further example are set forth herein, including those set forth in the claims.

Although certain products and methods constructed in accordance with the teachings of the examples of the invention have been described herein, the scope of coverage of this patent is not limited thereto. On the contrary, this patent covers all examples of the teachings of the invention fairly falling within the scope of the appended claims either literally or under the doctrine of equivalents.

This application claims priority to European Patent Application No. EP 16 001 759.6, filed Aug. 8, 2016. The entire content of European Patent Application No. EP 16 001 759.6 is incorporated herein.

The invention claimed is:

1. Method for verifying an identity of an email-address utilized by a client device, the method being performed by a server and comprising:
   receiving a request for verifying the identity of the email-address;
   in response to receiving the request for verifying the identity of the email-address, generating a first asymmetric key pair, KP1-S, comprising a private key, PrivK1-S, and a public key, PubK1-S;
   calculating a first verification token, VN-1, based on the private key, PrivK1-S, of KP1-S and a known public key, PubK-C, of an asymmetric key pair, KP-C, of the client device;
   transmitting a verification email message to the email-address to be verified comprising the public key, PubK1-S, of KP1-S, wherein the server signs the verification email message using a private key, PrivK2-S, of a second asymmetric key pair, KP2-S, of the server;
   receiving a response to the verification email message including a second verification token, VN-2, calculated by the client device based on the private key, PrivK-C, of KP-C and the public key, PubK1-S, transmitted in the verification email message, wherein the server verifies the response using the known public key PubK-C;
   verifying the identity of the email-address by verifying that VN-2 is identical to VN-1.

2. The method of claim 1, wherein the verification tokens, VN-1 and VN-2, are calculated based on a Diffie-Hellman key exchange method, in particular based on an elliptic curve Diffie-Hellman key exchange method.

3. The method of claim 1, wherein the public key PubK1-S is comprised in the header of the verification email message.

4. The method of claim 1, wherein the identity of the email address is verified only for a given amount of time before expiration.

5. The method of claim 1, wherein the method further comprises issuing a certificate in response to verifying that VN-1 is identical to VN-2.

6. The method of claim 1, wherein the method further comprises deleting the first asymmetric key pair KP1-S by the server in response to the verification email being transmitted to the email-address to be verified.

7. The method of claim 1, wherein the communication between the server and the client device is encrypted.

8. Method for verifying an email-address utilized by a client device, the method being performed by the client device and comprising:
   sending a request for verifying the identity of the email-address to a server;
   receiving a verification email message comprising a public key, PubK1-S, of a first asymmetric key pair, KP1-S, of the server which was generated in response to the request for verifying the identity of the email-address, wherein the verification email message is received by the email-address to be verified, wherein the verification email message is signed using a private key, PrivK2-S, of a second asymmetric key pair, KP2-S, of the server;
   calculating a verification token, VN-2, based on a private key, PrivK-C, of an asymmetric key pair, KP-C, of the client device and the public key PubK1-S received in the verification email message;
   transmitting the verification token VN-2 to the server.

9. The method of claim 7, wherein calculating and transmitting the verification token VN-2 are performed automatically.

10. The method of claim 8, further comprising extracting the public key PubK1-S from a header of the received verification email message.

11. A server for verifying an identity of an email-address utilized by a client device, the server adapted to:
   receive a request for verifying the identity of the email-address;
   in response to receiving the request for verifying the identity of the email-address, generate a first asymmetric key pair, KP1-S, comprising a private key, PrivK1-S, and a public key, PubK1-S;
   calculate a first verification token, VN-1, based on the private key, PrivK1-S, of KP1-S and a known public key, PubK-C, of an asymmetric key pair, KP-C, of the client device;
   transmit a verification email message to the email-address to be verified comprising the public key, PubK1-S, of KP1-S, wherein the server signs the verification email message using a private key, PrivK2-S, of a second asymmetric key pair, KP2-S, of the server;
   receive a response to the verification email message including a second verification token, VN-2, calculated by the client device based on a private key, PrivK-C, of KP-C and the public key, PubK1-S, transmitted in the verification email message, wherein the server verifies the response using the known public key PubK-C;
   verify the identity of the email-address by verifying that VN-2 is identical to VN-1.

12. The server of claim 11, further to calculate the verification tokens, VN-1 and VN-2, based on a Diffie-Hellman key exchange method, in particular based on an elliptic curve Diffie-Hellman key exchange method.

13. The server of claim 11, further to include the public key PubK1-S in the header of the verification email message.

14. The server of claim 11, further cause verification of the identity of the email address only for a given amount of time before expiration.

15. A client device for verifying an identity of an email-address utilized by the client device, adapted to:
   send a request for verifying the identity of the email-address to a server;
   receive a verification email message comprising a public key, PubK1-S, of a first asymmetric key pair, KP1-S, of the server which was generated in response to the request for verifying the identity of the email-address, wherein the verification email message was transmitted to the email-address to be verified, wherein the verification email message is signed using a private key, PrivK2-S, of a second asymmetric key pair, KP2-S, of the server;

calculate a verification token, VN-2, based on a private key, PrivK-C, of an asymmetric key pair, KP-C, of the client device and the public key PubK1-S received in the verification email message;

transmit the verification token VN-2 to the server.

16. Method for verifying an identity of an email-address utilized by a client device, comprising:

receiving, at a server, a request for verifying the identity of the email-address;

in response to receiving the request for verifying the identity of the email-address, generating, at the server, a first asymmetric key pair, KP1-S, comprising a private key, PrivK1-S, and a public key, PubK1-S, calculating, at the server, a first verification token, VN-1, based on the private key, PrivK1-S, of KP1-S and a known public key, PubK-C, of an asymmetric key pair, KP-C, of the client device;

transmitting, from the server to the email-address to be verified, a verification email message comprising the public key, PubK1-S, of KP1-S, wherein the server signs the verification email message using a private key, PrivK2-S, of a second asymmetric key pair, KP2-S, of the server;

receiving, at the client device, the verification email message;

calculating, at the client device, a second verification token, VN-2, based on a private key, PrivK-C, of the key pair KP-C and the public key PubK1-S received in the verification email message;

transmitting, from the client device to the server, the verification token VN-2;

verifying, at the server, the identity of the email-address by verifying that VN-2 is identical to VN-1.

17. System for verifying an identity of an email-address utilized by a client device, the system comprising the client device and being adapted to:

receive, at the server, a request for verifying the identity of the email-address;

in response to receiving the request for verifying the identity of the email-address, generate, at the server, a first asymmetric key pair, KP1-S, comprising a private key, PrivK1-S, and a public key, PubK1-S, calculate, at the server, a first verification token, VN-1, based on the private key, PrivK1-S, of KP1-S and a known public key, PubK-C, of an asymmetric key pair, KP-C, of the client device;

transmit, from the server to the email-address to be verified, a verification email message comprising the public key, PubK1-S, of KP1-S, wherein the server signs the verification email message using a private key, PrivK2-S, of a second asymmetric key pair, KP2-S, of the server;

receive, at the client device, the verification email message;

calculate, at the client device, a second verification token, VN-2, based on a private key, PrivK-C, of the key pair KP-C and the public key PubK1-S received in the verification email message;

transmit, from the client device to the server, the verification token VN-2;

verify, at the server, the identity of the email-address by verifying that VN-2 is identical to VN-1.

18. Computer program product for verifying an identity of an email-address utilized by a client device, the computer program product comprising:

a non-transitory computer-readable storage medium; and program code stored on the non-transitory computer-readable storage medium that, when executed by one or more server processors, causes the one or more server processors to:

receive a request for verifying the identity of the email-address;

in response to receiving the request for verifying the identity of the email-address, generate a first asymmetric key pair, KP1-S, comprising a private key, PrivK1-S, and a public key, PubK1-S;

calculate a first verification token, VN-1, based on the private key, PrivK1-S, of KP1-S and a known public key, PubK-C, of an asymmetric key pair, KP-C, of the client device;

transmit a verification email message to the email-address to be verified comprising the public key, PubK1-S, of KP1-S, wherein verification email message is signed using a private key, PrivK2-S, of a second asymmetric key pair, KP2-S, of the server;

receive a response to the verification email message including a second verification token, VN-2, calculated by the client device based on the private key, PrivK-C, of KP-C and the public key, PubK1-S, transmitted in the verification email message;

verify the identity of the email-address by verifying that VN-2 is identical to VN-1.

19. Computer program product for verifying an identity of an email-address utilized by a client device, the computer program product comprising:

a non-transitory computer-readable storage medium; and program code stored on the non-transitory computer-readable storage medium that, when executed by one or more client processors, causes the one or more client processors to:

sending a request for verifying the identity of the email-address to a server;

receive a verification email message comprising a public key, PubK1-S, of a first asymmetric key pair, KP1-S, of the server which was generated in response to the request for verifying the identity of the email-address, wherein the verification email message is received by the email-address to be verified, wherein the verification email message is signed using a private key, PrivK2-S, of a second asymmetric key pair, KP2-S, of the server;

calculate a verification token, VN-2, based on a private key, PrivK-C, of an asymmetric key pair, KP-C, of the client device and the public key PubK1-S received in the verification email message;

transmit the verification token VN-2 to the server.

\* \* \* \* \*